United States Patent [19]

Langner

[11] 3,738,719

[45] June 12, 1973

[54] BALL BEARING

[75] Inventor: Gerhard Langner, Sammarie-les-Lys, France

[73] Assignee: Societe Nationale d'Etude et de Construction de Moteurs d'Aviation, Paris, France

[22] Filed: Oct. 13, 1971

[21] Appl. No.: 188,818

[30] Foreign Application Priority Data
 Oct. 27, 1970 France .................. 7028702

[52] U.S. Cl. .......................... 308/189 A
[51] Int. Cl. .......................... F16c 33/00
[58] Field of Search ............ 308/193, 189.1, 18

[56] References Cited
UNITED STATES PATENTS
1,399,959  12/1921  Hanson ................ 308/193

Primary Examiner—Charles J. Myhre
Assistant Examiner—F. Susko
Attorney—William J. Daniel

[57] ABSTRACT

A bearing assembly for a rotating part liable to be subjected to an axial load of variable magnitude and direction, the bearing comprising two coaxial bearing sets each consisting of balls, an inner race and an outer race, the latter being mounted to slide axially, the two sliding races being resiliently urged towards respective abutment means, and the sliding motion of one of the such rings, in opposition to the action of the resilient impulsion, being limited by a second abutment means to an extent equal to the internal axial clearance of the other bearing.

2 Claims, 7 Drawing Figures

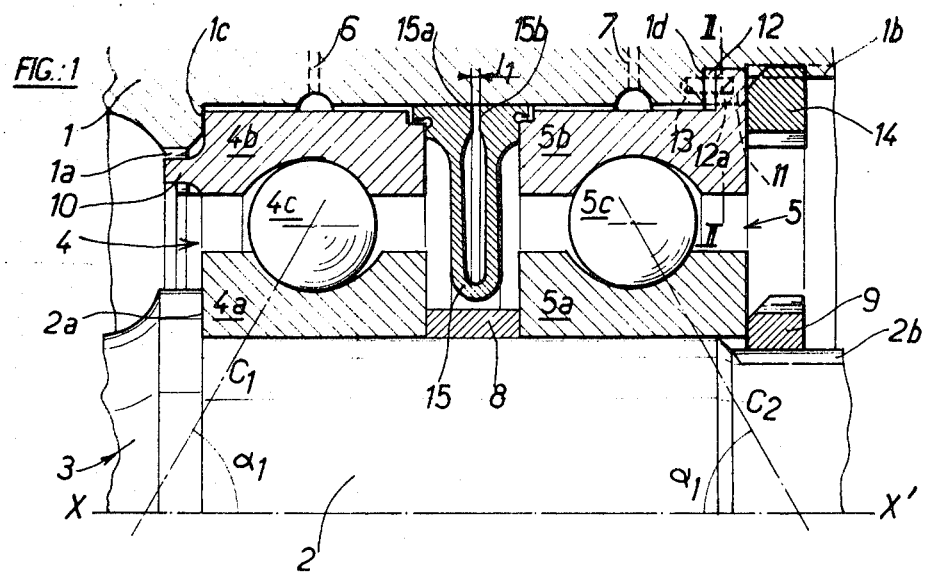
FIG.: 1
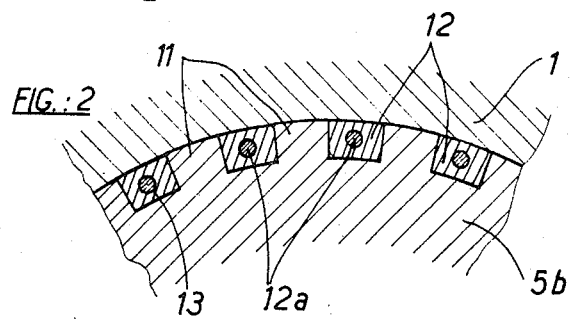
FIG.: 2
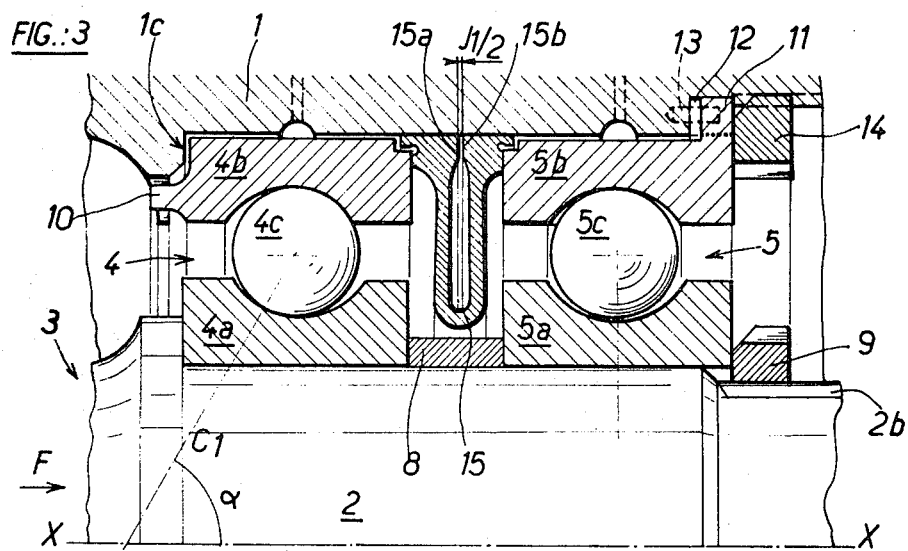
FIG.: 3

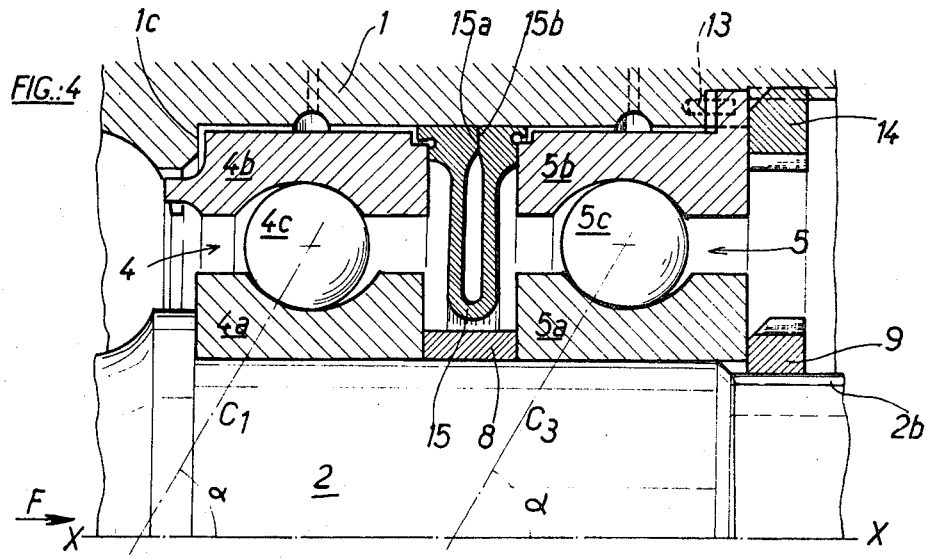
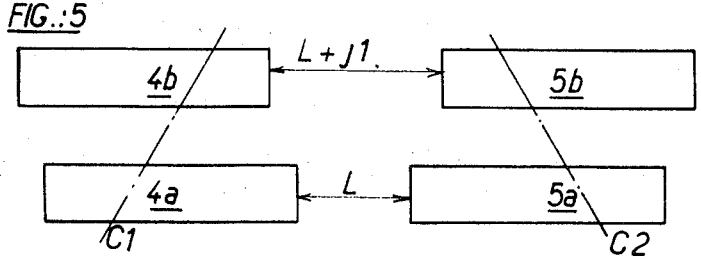
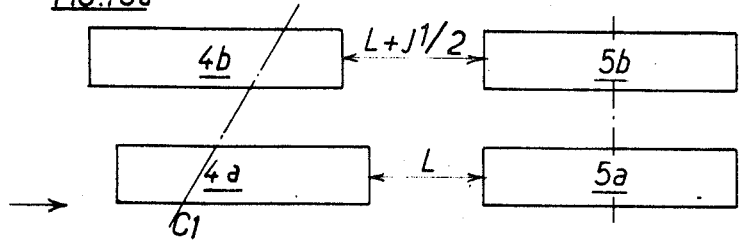
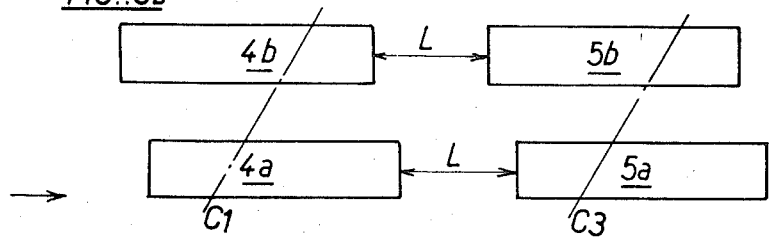

BALL BEARING

The invention relates to a ball bearing intended to provide support to a rotating part liable to be subjected to a variable axial load. It applies more especially to a bearing for a turbine engine rotor, for example for an aircraft jet turbine engine.

Rolling-element sets of bearings, and more especially rolling-element sets comprising balls, able to revolve at high speeds, inevitably possess a degree of internal radial play for reasons to do with fabrication, assembly, operation and lubrification. While at rest and at a low rotational speed, the axis of a rotor is therefore slightly displaced through gravity in a downward direction with reference to the theoretical axis of its bearing; when, with the speed increasing, the centrifugal force to which the rotor is subjected because of its unbalance, which is minor in degree but unavoidable, becomes equal to, and then higher than the weight of the rotor, it causes the latter to orbit around the axis of the bearing. The result of this is that engines such as turbine engines whose rotor, carried by ball bearings, is relatively light and revolves at high speeds, may be exposed to vibrations that are harmful to their proper operation.

The above holds good for rolling-element bearings which are subject only to radial loads. On the other hand, ball bearings subject to an axial load and acting, for example, as thrust bearings, re-center themselves in operation. In fact, by reason of the relative axial displacement of the inner and outer rings, radial play in the bearings is eliminated by their axial play being taken up, contact between the balls and the associated races being effected according to a given angle. With an appreciable axial load, vibrations are therefore suppressed. But in turbine engines in which the axial load varies, more particularly with speed, the danger of vibration exists even with a load which is zero or only small. This is particularly so in the case of aircraft turbine engines such as jet turbine engines, which are subject to considerable variations in the axial load as a function of the flight conditions of the aircraft on which they are mounted, and even to reversals of the direction of the load.

It is possible to subject a bearing to an axial load always directed in one and the same direction, whatever the rotor speed, by permanently applying to the bearing an additional thrust greater than the maximum axial load to which the rotor may well be subject, in the direction opposite to the latter thrust. This solution, however, has the drawback that it increases the load on the bearing, something which makes it necessary to provide a bearing with larger dimensions.

It is a known technique to arrange for an association, side by side, of two ball bearings to give support to a rotor in the same vicinity, for example at the end of the shaft, but in this case too the application of an additional thrust makes it necessary to oversize such bearings.

The present invention renders it possible to eliminate the radial play in a bearing comprising at least two ball bearings arranged side by side for the purpose of supporting a rotor liable to be subjected to an axial load of variable magnitude and able too to alter direction, and consequently to avoid vibrations at all speeds, this being achieved without applying any overload to the bearing.

To this end, according to the invention the respective internal axial plays of the two bearings are taken up in opposite directions by two thrusts applied respectively to one of the rings (outer or inner) of each of the two bearings sets, the ring being assembled with some axial clearance.

The said thrusts do not have to be very strong. It is sufficient that they should take up the axial clearance of the bearings while at rest. They may be exerted by any suitable means, such as prestressed resilient components (for example, V springs or a stack of Belleville washers) or hydraulic devices (for example, jacks operated by the pressure of the lubricating oil for the bearing).

In one embodiment of the invention, it is the two outer rings or the two inner rings of the bearings which are assembled with axial clearance, and they are urged apart by a prestressed resilient component. This is sufficient to apply oppositely directed thrusts to these two rings.

The said resilient component when at rest and at low speeds maintains a given axial load on at least one of the bearings so that the rotor is properly centered within the said set, the internal radial play in the latter being eliminated by its internal axial clearance having been taken up or, put another way, by the relative axial displacement of its inner and outer rings respectively under the action of the said axial load, as has been explained above. The said axial load, initially exerted by the resilient component, is then in a way relayed by the load of the rotor gradually, as it increases with the increase in speed. From the moment when the axial load of the rotor exceeds the maximum thrust exerted by the resilient component, the bearings cease to withstand the effect of the said thrust and they cooperate with each other to sustain the axial load of the rotor.

The said axial load of the rotor may therefore by shared equally between the bearings by virtue of a feature of the invention which consists in limiting, through an abutment device, the displacement of the rings (assembled with some axial clearance) against the action of the thrust exerted upon them.

The following description relating to the accompanying drawings, which are given by way of non-limitative example, will make it possible to acquire a good grasp of the advantages of the invention and of the art of putting them into effect, any feature emerging both from the text and the Figures naturally coming within the scope of the said invention.

FIG. 1 is a view of a half-section taken axially through a bearing according to the invention, this bearing comprising two ball bearings of which the outer rings are assembled in a stator with some axial clearance and are held apart by a spring, and of which the inner rings are axially clamped around a rotor shaft, the bearing shown at rest;

FIG. 2 is a fractional view of a section taken along the line II—II in FIG. 1;

FIG. 3 is a similar view to FIG. 1, showing the position of the parts when the shaft is rotating under a given axial load directed from the left to the right;

FIG. 4 is a similar view to FIG. 3, showing the position of the parts when the axial load of the rotor attains or exceeds the maximum thrust applied to the rings;

FIGS. 5, 5a and 5b illustrate diagrammatically the alterations in axial position which are undergone by the components of the bearing during acceleration.

Referring to the drawings, the bearing supports, within a stator or fixed housing 1, a shaft 2 of a rotor 3. The said bearing comprises two identical ball bearings 4, 5 (with balls) of which the inner rings 4a, 5a are assembled, without any play, on the shaft 2, and of which the outer rings 4b, 5b are assembled to provide light frictional contact in the stator 1 (that is, with a small degree of diametral play, of the order of a few hundredths of a millimeter, for example), and are capable of sliding axially; they are lubricated through orifices 6, 7 of the stator to obviate any contact corrosion. The bearings themselves are lubricated by means not shown here.

A ring 8, forming a spacer, ensures a constant axial distance between the inner rings 4a and 5a; the combination of the rings 4a, 5a and of the spacer 8 is clamped in position between a shoulder 2a of the shaft and a nut 9 screwed home on a thread 2b on the said shaft. The outer ring 4b is provided with projections 10 which fit in recesses 1a around the stator, and the outer ring 5b is provided with a castellated flange 11 (see FIG. 2) into the recesses of which there fit projections 12 each provided with a pin 12a which nestles in a blind bore 13 in the stator; the said projections 12 are held in place by a threaded ring 14 screwed into a tapping 1b in the stator. The castellated flange 11 is less wide than the projections 12, so that the ring 5b is able to slide in the stator to the left of the retainer 14. The outer rings 4b and 5b are urged apart by a prestressed annular spring 15 with a U section the two limbs of which form respective surfaces 15a, 15b facing each other.

FIG. 1 shows the bearing at rest. The outer rings 4b, 5b, urged by the spring 15, are spaced further apart than the inner rings 4a and 5a squeezed between the thrust-collars 2a, 9, the distance apart of the rings being governed by the spacer 8. The spring 15 supports the outer rings 4b, 5b on the inner rings 4a, 5a respectively, through the agency of the balls 4c, 5c. In this situation, the rings 4b and 5b are in contact with a shoulder 1c on the stator and with the nut 14 respectively, but the said shoulder 1c and the said nut 14 should not limit the spacing apart of the said outer rings, which should be able to find support, in the manner described above, on the inner rings through the agency of the balls.

The contact of the balls 4c with the races appertaining to the rings 4a and 4b is effected according to a cone of revolution $C_1$ with the angle $\alpha_1$, the cone passing through the centers of the said balls and having as its axis the axis $X - X'$ of the bearing assembly. Similarly, the contact of the bearing balls 5 is effected according to a cone $C_2$, having the same angle $\alpha_1$, but facing in a direction opposite to the cone $C_1$. The internal axial plays in the bearings 4, 5 are thus taken up in opposite directions by the thrusts applied by the spring 15 to their outer rings 4b, 5b. The spring, as it holds the outer rings apart, symmetrically displaces the lines of contact of the balls of the two bearings by placing a load on the said sets, the internal radial play of which is thus reduced to nil.

In this position of rest, the surfaces 15a, 15b of the spring 15 are separated by a clearance $J_1$.

An examination will now be made of the operation of the bearing upon starting and during acceleration of the rotor 3, it being assumed that it is subject to an axial load which may be counterbalanced and may alter in direction but which is in the first place directed from the left to the right.

The said axial load, directed from the left to the right (i.e. in the direction of the arrow F in FIGS. 3 and 4), is transmitted by the ring 4a to the ring 4b through the agency of the balls 4c of the bearing 4. The said ring 4b is therefore subject, on the one hand, to the said axial load directed from the left to the right and, on the other hand, to the thrust applied against it from the right to the left by the spring 15 which finds support on the ring 5b. The axial load is therefore transmitted by the spring 15 to the ring 5b. The result of this is that, upon the advent of this axial load, the threaded ring 14 operates as a thrust-collar and transmits the said axial load from the ring 5b to the stator 1. In the embodiment illustrated here, the ring 5b has already been in contact with the threaded ring 14; it consequently undergoes no displacement. If, on the other hand, upon assembly a certain clearance were provided between the ring 5b and the threaded ring 14, then the combination of the rotor 3 and of the two rolling-element sets 4, 5 in the position shown in FIG. 1 would undergo displacement in one block to the right, until the ring 5b comes to be abutting the threaded ring 14.

So long as the axial load remains less than the prestressing in the spring 15, the rings 4a, 4b, 5a, 5b of the bearing will remain in the position shown in FIG. 1. When the said axial load exceeds the prestressing of the spring 15, the latter undergoes deflection, so that the rotor 3 moves to the right, also involving the inner rings 4a and 5a, the ring 4a involving the ring 4b through the agency of the balls 4c. The ring 5b, kept abutting the threaded ring 14, ceases to find support on the balls 5c. FIG. 3 shows, by way of example, the position of the parts when the axial load has reached such a value that the clearance $J_2$ between the surfaces 15a and 15b of the spring is half the clearance $J_1$ in FIG. 1. These balls 5c are kept by centrifugal force against the outer ring 5b and do not touch the inner ring 5a because of the internal radial clearance of the bearing 5. This latter will no longer be under load, and it would be the cause of vibrations if it alone were supporting the shaft 2 within the bearing, but the said shaft remains centered by the bearing 4, which for its part is under load. The outer ring 4b of the said bearing 4 follows the shifting of the inner ring 4a by moving away from the shoulder 1c, in opposition to the growing thrust applied on it by the spring 15 as it finds support on the ring 5b which is abutting the threaded ring 14. The angle $\alpha$ of the cone $C_1$ remains substantially equal to $\alpha_1$. The rolling-element set 5 no longer plays any role, and the rolling-element set 4, alone and without any play, sustains the entire axial load of the shaft 2.

As the axial load of the rotor continues to increase with the speed, the rings 4a, 5a and 4b continue their shift towards the right, compressing the spring 15, until the ring 5a comes to rest, through the agency of the balls 5c, against the ring 5b, which is still abutting the threaded ring 14. In this position, which is shown in FIG. 4, the contact of the balls 5c with the races appertaining to rings 5a and 5b is effected according to a cone of revolution $C_3$ directed the same way as the cone $C_1$. The rotor is no longer able to move to the right (except through resiliency in the balls and in the rings associated with the bearings), with the result that the thrust of the spring 15, unable to be compressed further, is at a maximum and can no longer increase. The axial load of the rotor passes over to the stator partly via the bearing 4 (by way of the ring 4b, the spring 15, the ring 5b and the threaded ring 14 as described above) and partly via the ring 4a, the spacer 8, the bearing 5 and the threaded ring 14. The load is therefore distributed over the two bearings, and the respective inner radial plays of the two sets are eliminated.

In order to permit the bearing 5 to assume the position shown in FIG. 4, it is clearly necessary that the clearance $J_1$ between the surfaces 15a and 15b of the spring (see FIG. 1) should be at least equal to the internal axial clearance appertaining to the bearing 5 (i.e. to the internal axial clearance of each of the bearings, since the latter are identical). If the clearance $J_1$ were larger than the said internal axial clearance, the portion of the axial load transmitted by the bearing 4 would not be capable of exceeding the maximum thrust exerted by the spring 15, the excess of said axial load being transmitted through the bearing 5. It would therefore be possible to share, on an approximately equal basis between the two bearings, the maximum axial load appertaining to the rotor, this being done by making a judicious selection of the strength of the spring. It will, however, be preferable to give to the clearance $J_1$ a value equal to the internal axial clearance of each of the bearings, as in the embodiment shown here, so that in respect of considerable axial loads (see FIG. 4) the surface 15a will come to abut the surface 15b. It is thus possible to decrease the strength of the spring, hence to reduce the thrust exerted by it on the bearings, and consequently wear in the latter when rotating at low speeds. As soon as the axial thrust of the rotor becomes greater than the maximum thrust of the spring (FIG. 4), the ring 4b is positively in abutment against the threaded ring 14 (since the surfaces 15a and 15b are abutting each other) at the same time as the bearing 5 takes its share of the load, its internal axial clearance being taken up in the same direction as that of the bearing 4. Appreciable axial thrusts are therefore shared equally between the two sets.

FIGS. 5, 5a and 5b provide a diagrammatic representation of the displacements undergone by the rings (these displacements being exaggerated to demonstrate them more clearly between the positions in FIGS. 1, 3 and 4 respectively. With the distance between the rings 4a and 5a taken as L, the distance between the rings 4b and 5b will be $L + J_1$ in FIGS. 1 and 5, $L + (J_1/2)$ in FIGS. 3 and 5a, L in FIGS. 4 and 5b.

With the two bearings mounted symmetrically and at rest, the operation of the bearing when subject to an axial load directed from the right to the left is identical with that already described, displacements being effected from right to left and the operation of the two sets 4 and 5 being reversed. The bearing 5 on its own sustains minor loads and transmits them to the ring 4b which is abutting the shoulder 1c; then, with the load increasing, the internal axial play in the set 4 is taken up in the same direction as that of the set 5, and the load is distributed between the two sets. The axial clearance between the castellated flange 11 and the shoulder 1d of the stator (see FIG. 1) should naturally be sufficiently large to allow the ring 5b to undergo displacement to the left, until the set 4 takes up its share of the load.

It is self-evident that the embodiment described above is only an example and that it would be possible to modify it, more especially through replacement by technical equivalent means, without however thereby going beyond the scope of the invention. In particular, the taking up in opposite directions of the internal axial clearances of the two bearings could be effected by other means. For example, the outer rings, assembled with axial clearance, could be pushed axially towards each other instead of being pushed resiliently apart. The rings assembled to give axial clearance could well be inner rings, the outer rings being tightly locked axially. It would also be possible to assemble with some axial clearance both the outer ring of one of the rolling-element sets and the inner ring of the other set, the two rings being resiliently urged in an identical direction.

The bearing assembly could comprise more than two bearings, for example a third set possessing an inner ring which is solid with the ring 4a, and an outer ring which is solid with the ring 4b.

I claim:

1. A bearing assembly comprising first and second ball bearings arranged side by side to support a rotatable member liable to be subjected to an axial load of variable magnitude and direction, each bearing having a set of balls arranged to run between an inner race and an outer race and to define an internal axial play therebetween, one of the races of each bearings being mounted for slidable axial movement, thrust means resiliently urging said two slidable races in respective axial directions to take up said internal axial plays in opposite directions, a pair of abutment means each adapted to abut a corresponding slidable race for taking said axial load, and further abutment means for limiting movement of the slidable race of the first bearing in the direction opposite to the thrust of said thrust means to a distance substantially equal to the extent of internal axial play in the second bearing.

2. A bearing assembly according to claim 1, in which the two ball bearings are identical, the thrust means comprises a prestressed resilient component urging the two slidable races apart, and the further abutment means comprises surfaces of said resilient component which are adapted to engage each other in order to limit compression of said resilient component to a distance substantially equal to the extent of internal axial play of the two bearings.

* * * * *